United States Patent [19]

Wolff

[11] Patent Number: 4,815,416

[45] Date of Patent: Mar. 28, 1989

[54] WORM CONTAINER

[76] Inventor: Elmer M. Wolff, 385 Windsor Cir., North, Billings, Mont. 59105

[21] Appl. No.: 86,505

[22] Filed: Aug. 18, 1987

[51] Int. Cl.$^4$ .................. A01K 67/00; A01K 97/04
[52] U.S. Cl. .................................... 119/15; 43/55
[58] Field of Search ............... 119/1, 15; 43/54.1, 43/55

[56] References Cited

U.S. PATENT DOCUMENTS

| | | | |
|---|---|---|---|
| 2,597,002 | 5/1952 | Johnson et al. | 43/55 |
| 2,885,819 | 5/1959 | Newell et al. | 43/55 |
| 3,468,289 | 9/1969 | Broida | 119/15 |
| 3,654,903 | 4/1972 | Montgomery | 119/15 |
| 3,882,628 | 5/1975 | Stouder | 43/55 |
| 4,450,647 | 5/1984 | Schmidt | 43/55 |

Primary Examiner—Robert P. Swiatek
Attorney, Agent, or Firm—Richard C. Litman

[57] ABSTRACT

A worm container includes an insulated pail covered with a mesh lid and filled with mulch. An elongated cylindrical mesh barrier with a bore therethrough is centrally disposed within the pail and contains a capped receptacle disposed within its bore adapted to contain a substance which facilitates the condensation of air. Water produced during the condensation process is then absorbed by the mulch through the mesh barrier to provide a suitable climate for supporting the life of the worms.

13 Claims, 1 Drawing Sheet

WORM CONTAINER

BACKGROUND OF THE INVENTION

1. Field of Invention

The invention relates to worms and more particularly, the invention is directed to an improved design for preserving live worms in hot or cold weather.

The invention further relates to an improved design which provides a moistening means for the worm habitat. More particularly, the invention is directed to providing a guard means for the worms by keeping flies, insects, and the like out of their habitat, while simultaneously allowing air to freely enter through it.

The invention would be particularly appreciated by those who understand the importance of having fresh live worms, especially travelers who fish sporadically or those who go on extended fishing trips.

The method of construction of the device is more fully described herein.

2. Description of the Prior Art

Various prior art worm containers and the like, as well as their apparatuses and the method of their construction in general, are known and are found to be exemplary of the U.S. prior art. They are:

| U.S. Pat. Nos. | Inventor |
| --- | --- |
| 223,162 | O. C. Nuubson |
| 692,109 | N. F. Boniface |
| 832,556 | S. E. Oviatt |
| 1,150,776 | P. Lamb |
| 2,697,296 | R. N. Steele |
| 3,143,263 | A. J. Farmer |
| 3,524,571 | H. C. Young et al |
| 4,323,181 | J. Spasoff |
| 4,353,182 | R. J. Junkas et al |
| 4,527,350 | D. R. Tockey Jr. |

U.S. Pat. Nos. 223,162 to Nuubson; 692,109 to Boniface; and 832,556 to Oviatt disclose cooling devices for preserving perishables. All of these devices have cooling means in their center.

The remainder of the above patents are relevant to the field of the present invention and illustrate various bait containers or the like.

These patents or known prior uses teach and disclose various types of worm preserving devices, as well as methods of their construction; but none of them, whether taken singly or in combination, discloses the specific details of the combination of the present invention in such a way as to bear upon the claims as presented herein.

SUMMARY OF THE INVENTION

An object of the invention is to provide a novel device that lends itself to carrying worms.

Another object of the invention is to provide a novel device that lends itself to the preservation of live worms in hot or cold weather.

A further object of the invention is to provide a novel and improved method of construction of a worm carrier whereby a guard means is incorporated therein, serving to keep flies and the like out, while allowing air to circulate through the worm's habitat.

Still another object of the invention is to provide a novel and improved construction of a worm carrier whereby a moistening means is incorporated therein allowing for the moistening of the the worm's habitat.

Another object of the invention is to provide a novel device that is simple to construct and is light in weight.

These, together with other objects and advantages of the invention, reside in the details of the process and the operation thereof, as is more fully hereinafter described and claimed. Reference is made to the drawings forming a part hereof, wherein like numerals refer to like parts throughout.

p DESCRIPTION OF THE PREFERRED EMBODIMENT

Figures 1, 2:
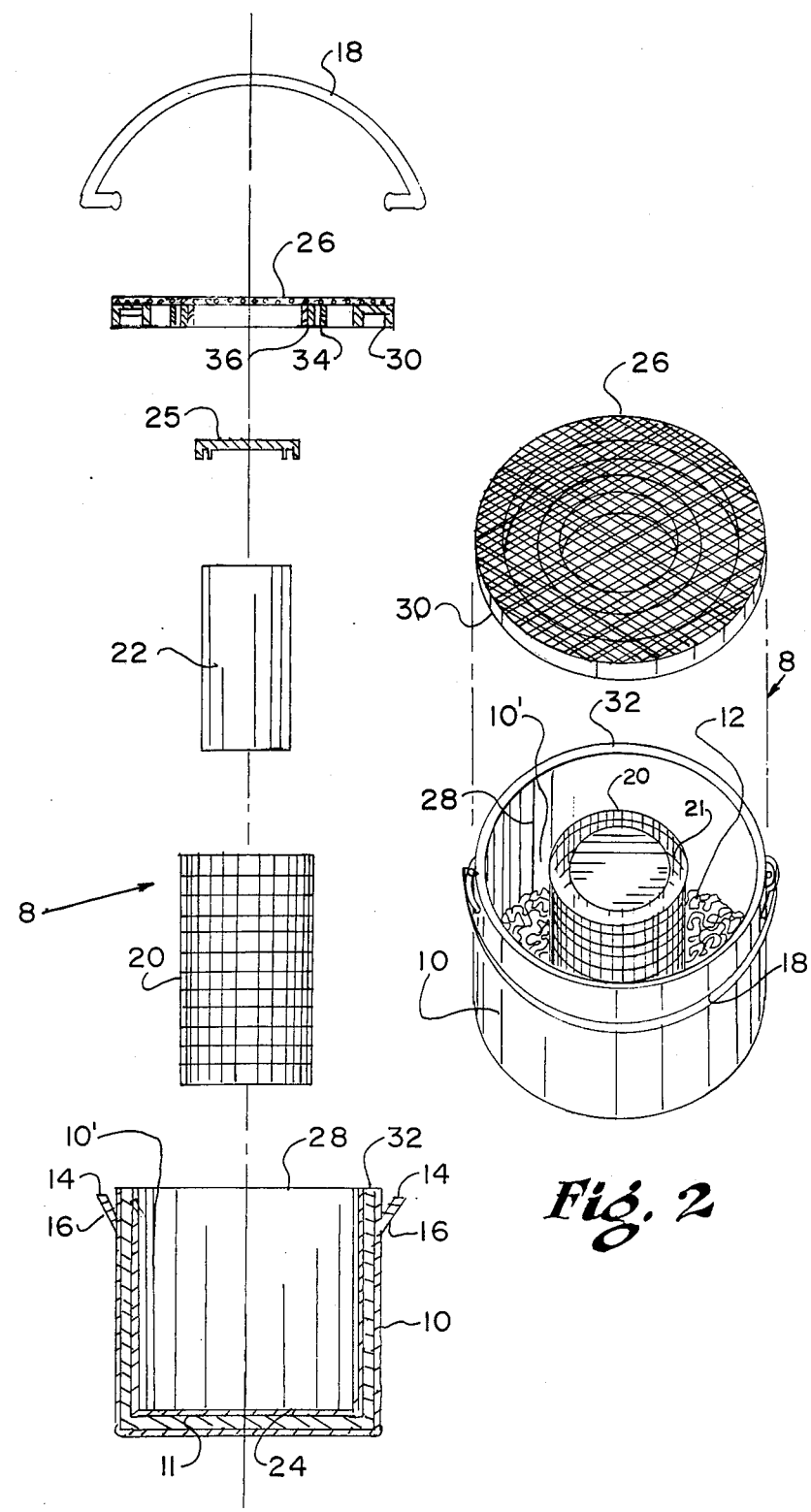
FIG. 1 illustrates an exploded front view, partly in section, of the invention
FIG. 2 illustrates an exploded top perspective view of the invention.

Referring now to the drawings, there is shown in FIGS. 1 and 2 an exploded view of a worm carrier 8 made of a stiff plastic or other suitable material, comprising a cylindrical pail 10 having an expanded foam insulation 11. The pail 10 provides a containment means or cavity 10' for an aerated or porous filler element, such as mulch 12 that serves as a habitat for the worms.

The pail 10 will be seen to include a pair of external projections 14 diametrically disposed adjacent its upper periphery, each containing a hole 16 therein to support a bail 18 which provides a gripping means for the invention. A cylindrical mesh barrier 20, having an axial bore 21 therethrough is adapted to house an open top cylindrical, impervious receptacle 22 in a centrally disposed manner spaced from the insulation 11 adjacent to the bottom surface 24 of the pail 10. The receptacle 22, having ice or hot water therein as appropriate to facilitate condensation of the air, is disposed within the bore 21 of the barrier 20 and then covered with an insulated plastic cap 25 to prevent spillage of the contained substance. The mulch 12 serves to absorb water produced during the condensation process through the mesh 20, thereby providing a suitable climate for the worms. Once the ice melts or water becomes cool, the receptacle 22 is refilled with ice or hot water as necessary.

A mesh covered lid 26, which serves to cover the top area 28 of the pail 10, provides a guard means for the worms by keeping flies and the like out of the pail 10, while allowing air to enter it. The lid 26 includes an outer snap fitting rim 30 to secure it about the upper outer edge 32 of the pail 10, and a concentric inner snap fitting rim 34, which secures the lid 26 to the open top of the mesh barrier 20, includes a soft rubber ring 36 disposed within it to provide a seal means between the inner snap fitting rim 34 and the capped receptacle 22. In this manner, the plurality of components of the device are positively retained in a secure, concentric disposition, insuring proper air circulation together with the desired temperature and moisture exchange.

The foregoing is considered as illustrative of the principles of the invention. Further, since numerous modifications and changes will readily occur to those skilled in the art, it is not desired to limit the invention to the exact construction and operation shown and described, and accordingly, all suitable modifications and equivalents which may be resorted to, fall within the scope of the invention.

What is claimed is:

1. An apparatus for carrying and preserving worms comprising:

an open top container having an internal cavity, a cylindrical barrier insertable within said container cavity, an impervious receptacle disposed within said cylindrical barrier and adapted to contain a substance exhibiting a temperature substantially differing from that of the atmosphere, mulch material at least partially filling said cavity between said barrier and container and adapted to serve as a habitat for worms, and means maintaining said receptacle in a fixed spatial relationship to said container during carrying and use of the apparatus.

2. The apparatus of claim 1, wherein the components of the apparatus are of plastics.

3. The apparatus of claim 1, wherein said container comprises an insulated pail.

4. The apparatus of claim 1, wherein said maintaining means includes a mesh lid.

5. The apparatus of claim 4, wherein said lid includes an outer snap-fitting rim engageable with the top of said container.

6. The apparatus of claim 5, including a cap enclosing the top of said receptacle and said lid includes an inner snap-fitting rim engageable with said receptacle cap.

7. The apparatus of claim 6, including seal means on said inner snap-fitting rim.

8. The apparatus of claim 4, wherein said lid includes an inner snap-fitting rim engageable with said receptacle.

9. The apparatus of claim 1, wherein said barrier comprises a mesh material.

10. The apparatus of claim 1, wherein said container, and receptacle are cylindrical and said maintaining means retains said container, barrier and receptacle in a concentric disposition.

11. The apparatus of claim 1, wherein said receptacle is filled with ice to moisten said mulch material.

12. The apparatus of claim 1, wherein said receptacle is filled with hot water to moisten said mulch material.

13. The apparatus of claim 1, including gripping means pivotally attached to said container.

* * * * *